United States Patent [19]

Coenen et al.

[11] 4,406,504
[45] Sep. 27, 1983

[54] DEVICE FOR FASTENING AN AXLE WITH ROLLING BEARINGS IN CYLINDRICAL TUBING

[75] Inventors: Hendrikus P. Coenen, Zutphen; Cornelis Van Wageningen, Dieren, both of Netherlands

[73] Assignee: Gazelle Rijwielfabriek B.V., Dieren, Netherlands

[21] Appl. No.: 332,097

[22] Filed: Dec. 17, 1981

[51] Int. Cl.³ .............................................. F16C 35/06
[52] U.S. Cl. .................................. 308/192; 308/189 R
[58] Field of Search ................... 308/192, 189 R, 238, 308/237 R, 189 A, 207 R, 207 A, 190, 191; 464/178, 16, 20; 403/289, 290; 24/201 C

[56] References Cited

U.S. PATENT DOCUMENTS

| 958,548 | 5/1910 | Sapp | 308/191 |
|---|---|---|---|
| 3,266,006 | 8/1966 | Abbott | 308/189 R X |
| 3,413,021 | 11/1968 | Potts | 403/289 X |
| 3,966,276 | 6/1976 | Bellarbre et al. | 308/238 |
| 4,236,767 | 12/1980 | Feldle | 308/189 R X |

Primary Examiner—Stuart S. Levy
Assistant Examiner—David Werner
Attorney, Agent, or Firm—Birch, Stewart, Kolasch and Birch

[57] ABSTRACT

The invention relates to a device for fastening an axle with rolling bearings in a cylindrical tubing comprising two annular sleeves having inward extensions for locking up the outer races of the rolling bearings with fastening members for relatively fixing the sleeves in place and with an outward shoulder at the end remote from the fastening members. The invention provides a device of the kind set forth, in which the sleeves are made from elastic material and the sleeves each have an inner groove at the end having the shoulder for fitting the outer races of the bearings and at the other ends hook-like fastening members fitting around one another, while the outer sleeve has longitudinal slots at said end.

12 Claims, 1 Drawing Figure

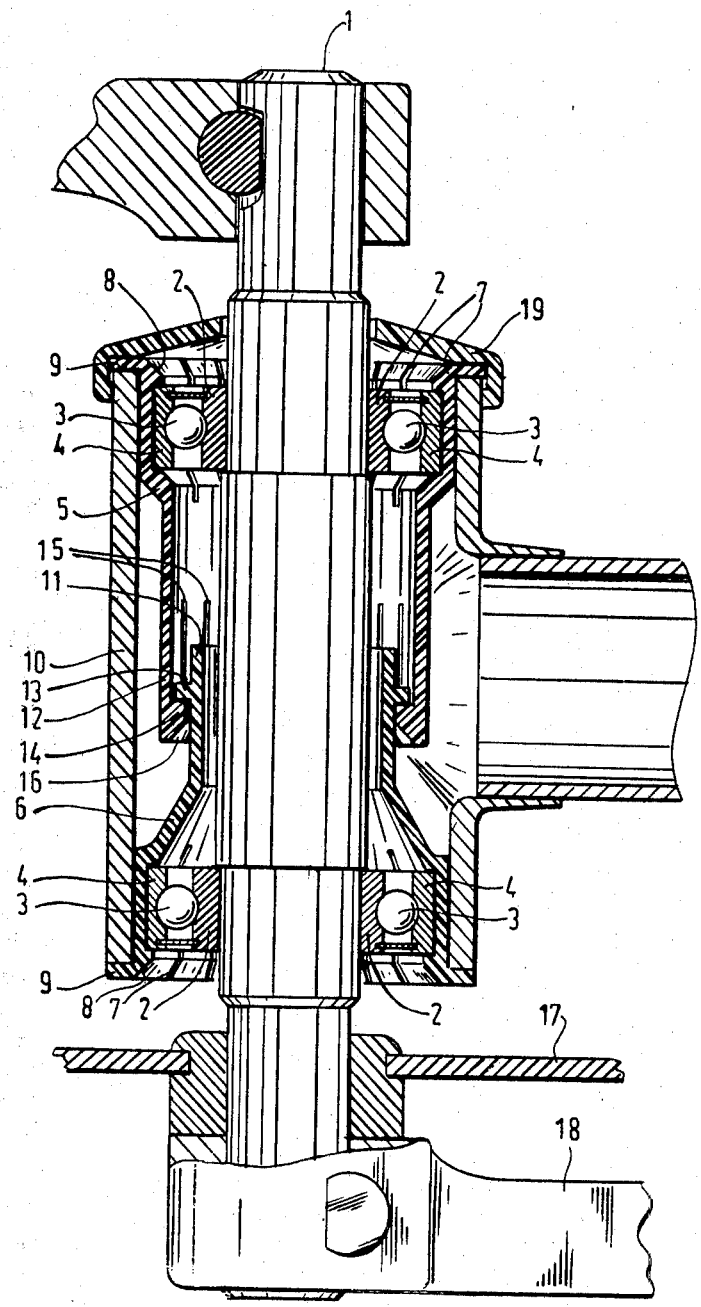

DEVICE FOR FASTENING AN AXLE WITH ROLLING BEARINGS IN CYLINDRICAL TUBING

SUMMARY AND BACKGROUND OF THE INVENTION

The invention relates to a device for fastening an axle with rolling bearings in a cylindrical tubing comprising two annular sleeves having inward extensions for locking up the outer races of the rolling bearings with fastening members for relatively fixing the sleeves in place and with an outward shoulder at the end remote from the fastening members. Such a device, which may be employed for mounting the crank axle in a bicycle frame, is known from German Patent Application No. 2,647,289 and it comprises in the embodiment shown therein two sleeves having external screwthread to engage a frame tubing having internal screwthread. In order to move the sleeves to the correct locations they are each provided with a set nut and the distance between the two sleeves is determined by a length of tube. Mounting an axle by means of such a device in a circuitous and time-consuming operation. During the course of time while the axle is mounted the sleeves may become loose so that the assembly will exhibit an amount of play.

OBJECTS OF THE INVENTION

The invention has for its object to obviate these disadvantages and provides to this end a device of the kind set forth in the preamble, which is furthermore characterized in that the sleeves are made from elastic material and the sleeves each have an inner groove at the end having the shoulder for fitting the outer races of the bearings and at the other ends hook-like fastening members fitting around one another, whilst the outer sleeve has longitudinal slots at said end.

After being provided with a rolling bearing, in one of which an axle is provided, the two sleeves are introduced each other from one side into the tubing so that the axle will also lie in the other bearing, after which the hook-like fastening members are brought into engagement with one another. In this embodiment only the tubing need have an accurately fixed, axial length corresponding to the distance between the outwardly extending shoulders after being assembled.

In order to permit of simply mounting of the bearings the two sleeves are preferably provided at the ends having the inner grooves for the rolling bearings with longitudinal slots.

Suitable elastically resilient materials that can be readily shaped in the required form are, for example, synthetic resins, particularly polyamides, polyacetals and similar thermo-plastic synthetic substances.

Although the hook-like members for fastening the two sleeves to one another can be brought into relative engagement in various ways, for example, by withdrawing a block from between the teeth bounded by the slots or by using the memory of thermo-plastic synthetic resins, the hook-like members are preferably formed by an outer shoulder on the inner sleeve and an inner shoulder on the outer sleeve, said shoulders being directed towards the other ends, whilst at least one of the sleeves has a conical surface so as to form a leading rim for inserting one sleeve into the other. When such an embodiment is used, the two sleeves can be united simply by moving one towards the other.

In order to arrange the bearings in the sleeves in a simple manner they preferably have a flaring end on the side remote from the fastening members, the largest diameter of the funnel being at least equal to the largest diameter of the inner groove.

BRIEF DESCRIPTION OF THE DRAWING

The invention will be described more fully with reference to a drawing showing an axial sectional view of a preferred embodiment.

DETAILED DESCRIPTION OF THE INVENTION

A conventional crank axle 1 having turned-off ends is provided with the inner races 2 which form a part of ball bearings 2, 3, 4. The outer races 4 of said ball bearings are located in inner grooves of fastening sleeves 5, 6.

The fastening sleeves 5, 6 of suitable synthetic resin each have a plurality of longitudinal slots 7 at the ends having the inner grooves so that in this area the sleeve can be widened for inserting the ball bearings in the grooves. In order to facilitate this operation the sleeves have flared ends 8 on said side, the largest diameter of said end being at least equal to the largest diameter of the ball bearing and the corresponding largest diameter of the inner groove. At said ends the two sleeves are also provided with outer shoulders 9, each of which is bearing on an end of a tubing 10, the inner diameter of which corresponds with the outer diameter of the sleeves 5, 6 at the area of the bearings 2, 3, 4.

At their proximal ends the sleeves have complementary fastening members. In the embodiment shown the sleeve 6 is fitted by its inner end 11 in the inner end 12 of the other sleeve 5. The inner end 11 of the sleeve 6 is provided with a shoulder 13 and the inner end 12 of the sleeve 5 with an inner shoulder 14 gripping behind the former. In order to permit assembly of the two shoulders one across the other at the insertion of the sleeves 5, 6 into the tubing 10, the inner end of the sleeve 5 has a plurality of longitudinal slots 15 so that this end can be elastically widened. Widening is facilitated by the funnel-like shape of said end so that upon the insertion of the shoulder 13 the tags bounded by the slots 15 are radially pushed aside. After the shoulder 13 has passed by the tags 16 leap back into the original position and the hooks formed by the shoulder 14 grip behind the shoulder 13.

Instead of providing the sleeve 5 with a funnel-shaped end, the sleeve 6 may be provided with a conical end.

The crank axle is provided in a conventional manner with a sprocket 17 and a crank 18. For protection against dirt a covering cap 19 may be arranged on one or on both ends of the tubing 10.

Although ball bearings are shown in the Figure and mentioned in the specification, it will be obvious to those skilled in the art that other rolling bearings such as needle bearings and roller bearings may be employed.

We claim:

1. A device for fastening an axle with rolling bearings in a cylindrical tubing comprising: two annular sleeves having inward extensions for locking up outer races of the rolling bearings and having hook-like fastening members for relatively fixing the sleeves in place relative to the cylindrical tubing; an outward shoulder positioned at the ends of said annular sleeves remote from the fastening members; said sleeves being constructed from elastically resilient material and having an inner groove at the ends provided with said shoulders for fitting the outer races of the bearings and the other ends being provided with said hook-like fastening members; said annular sleeves being fitted one around the other and the outer sleeve being provided with longitudinal slots at said end containing said hook-like fastening member;

wherein the hook-like fastening members are formed by an outer shoulder on the inner sleeve and an inner shoulder on the outer sleeve, said inner and outer shoulders being directed towards said other ends and at least one of the sleeves includes a conical surface for forming a leading rim at the insertion of one sleeve into the other.

2. A device as claimed in claim 1, wherein the ends having the inner grooves for the rolling bearings of said sleeves include longitudinal slots.

3. A device as claimed in claim 1 or 2, wherein the side remote from the fastening members of the sleeves include a flaring end, the largest diameter of which is at least equal to the largest diameter of the inner groove.

4. A device as claimed in claim 3, wherein the device is made of synthetic resin.

5. A device as claimed in claim 4, wherein the device is made of polyamide or polyacetal.

6. A sleeve assembly for fastening rolling bearings in operative relationship relative to an axle disposed within a cylindrical tubing comprising:

an inner sleeve having a predetermined length;

an outer shoulder positioned at one end of said inner sleeve for engagement with the cylindrical tubing;

a fastening member positioned at the other end of said inner sleeve;

a groove provided at the outer shoulder end of said inner sleeve for receiving an outer race of said rolling bearing and for operatively positioning an inner race of said rolling bearing in engagement with said axle;

an outer sleeve having a predetermined length;

an outer shoulder positioned at one end of said outer sleeve for engagement with the cylindrical tubing;

a fastening member positioned at the other end of said outer sleeve;

a groove provided at the outer shoulder end of said outer sleeve for receiving an outer race of said rolling bearing and for operatively positioning an inner race of said rolling bearing in engagement with said axle;

said inner and outer sleeves being fitted one within the other and said outer sleeve including at least one longitudinal slot for permitting said outer sleeve to be biased outwardly as said inner sleeve is initially inserted therein and being resilient to snap back to the original configuration of said outer sleeve after said fastening member of said inner sleeve lockingly engages with said fastening member of said outer sleeve for operatively positioning said inner and outer sleeves within said cylindrical tubing with said rolling bearings being in contact with said axle and said outer shoulder of said inner and outer sleeves.

7. A sleeve assembly according to claim 6, wherein said outer shoulders of said inner and outer sleeves include longitudinal slots for permitting said outer shoulders to be biased outwardly as said rolling bearing is inserted into said groove.

8. A sleeve assembly according to claim 6, wherein said fastening member on said inner sleeve is a hook-like member projecting outwardly toward said outer sleeve and said fastening member on said outer sleeve is a hook-like member projecting inwardly toward said inner sleeve.

9. A sleeve assembly according to claim 6, wherein at least one of said inner and outer sleeves include a conical surface for forming a leading rim at the insertion of said inner sleeve within said outer sleeve.

10. A sleeve assembly according to claim 6, wherein said inner and outer sleeves include a flaring end, a largest diameter being at least equal to the largest diameter of said groove.

11. A sleeve assembly according to claim 6, wherein the inner and outer sleeves are constructed of synthetic resin.

12. A sleeve assembly according to claim 6, wherein the inner and outer sleeves are constructed of polyamide or polyacetal.

* * * * *